(12) United States Patent
Tarui

(10) Patent No.: US 11,448,316 B2
(45) Date of Patent: Sep. 20, 2022

(54) SHIFT RANGE CONTROL APPARATUS

(71) Applicant: DENSO CORPORATION, Kariya (JP)

(72) Inventor: Jun Tarui, Kariya (JP)

(73) Assignee: DENSO CORPORATION, Kariya (JP)

( * ) Notice: Subject to any disclaimer, the term of this patent is extended or adjusted under 35 U.S.C. 154(b) by 609 days.

(21) Appl. No.: 16/449,539

(22) Filed: Jun. 24, 2019

(65) Prior Publication Data
US 2019/0309844 A1 Oct. 10, 2019

Related U.S. Application Data

(63) Continuation of application No. PCT/JP2017/045455, filed on Dec. 19, 2017.

(30) Foreign Application Priority Data

Dec. 27, 2016 (JP) .............................. JP2016-253644

(51) Int. Cl.
*F16H 61/32* (2006.01)
*H02P 23/18* (2016.01)
*H02P 6/24* (2006.01)
*F16H 63/38* (2006.01)

(52) U.S. Cl.
CPC ............ *F16H 61/32* (2013.01); *F16H 63/38* (2013.01); *H02P 6/24* (2013.01); *H02P 23/183* (2016.02); *F16H 2061/326* (2013.01)

(58) Field of Classification Search
CPC .... F16H 61/32; F16H 63/38; F16H 2061/326; H02P 6/24; H02P 23/183
See application file for complete search history.

(56) References Cited

U.S. PATENT DOCUMENTS

| 4,532,460 A * | 7/1985 | Gale ...................... H02K 29/08 318/139 |
| 4,651,066 A * | 3/1987 | Gritter ................... H02K 21/22 318/139 |
| 2005/0215375 A1* | 9/2005 | Kimura ..................... F16H 1/32 475/149 |
| 2007/0046243 A1 | 3/2007 | Hori et al. |
| 2015/0285373 A1 | 10/2015 | Nagahori et al. |

FOREIGN PATENT DOCUMENTS

| JP | 2007-271036 | 10/2007 |
| JP | 2012-090446 | 5/2012 |

OTHER PUBLICATIONS

English Translation of PCT/ISA/237 for PCT/JP2017/045455 (Year: 2017).*

* cited by examiner

*Primary Examiner* — Victor L MacArthur
(74) *Attorney, Agent, or Firm* — Nixon & Vanderhye P.C.

(57) ABSTRACT

A shift range control apparatus controls driving of a motor in a shift range switching system provided with the motor and a shift range switching mechanism. A drive controller controls the driving of the motor to fit an engaging member in a recess according to a shift range in response to that the shift range is switched. A polarity determination device determines a polarity of a stator, which faces a rotor. The drive controller causes the engaging member to move to the recess according to the shift range, and then performs cancel energization control to energize a coil with a cancellation current which is a current reducing the magnetic flux density of the stator according to the polarity of the stator.

4 Claims, 13 Drawing Sheets

FIG. 12A

| | STATE OF ENCODER (HALL IC) | | | STATE OF CANCEL ENGERIZATION | | |
|---|---|---|---|---|---|---|
| | IC 131 | IC 132 | IC 133 | U-PHASE | V-PHASE | W-PHASE |
| STATE 1 | N | N | S | N | S | – |
| 2 | S | N | S | N | – | S |
| 3 | S | N | N | – | N | S |
| 4 | S | S | N | S | N | – |
| 5 | N | S | N | S | – | N |
| 6 | N | S | S | – | S | N |

FIG. 12B

| | <1> | <2> | <3> | <4> | <5> | <6> |
|---|---|---|---|---|---|---|
| SW411 | ON | | | | | ON |
| SW412 | | ON | ON | | | |
| SW413 | | | | ON | ON | |
| SW414 | | | ON | ON | | |
| SW415 | | | | | ON | ON |
| SW416 | ON | ON | | | | |
| U-PHASE | N | – | S | S | – | N |
| V-PHASE | – | N | N | – | S | S |
| W-PHASE | S | S | – | N | N | – |

SHIFT RANGE CONTROL APPARATUS

CROSS REFERENCE TO RELATED APPLICATION

The present application is a continuation application of International Patent Application No. PCT/JP2017/045455 filed on Dec. 19, 2017, which designated the U.S. and claims the benefit of priority from Japanese Patent Application No. 2016-253644 filed on Dec. 27, 2016. The entire disclosures of all of the above applications are incorporated herein by reference.

TECHNICAL FIELD

The present disclosure relates to a shift range control apparatus.

BACKGROUND

A shift range switching device switches a shift range by controlling a motor in accordance with a shift range switching request made by a driver.

SUMMARY

The present disclosure describes a shift range control apparatus for controlling a motor in a shift range switching system.

BRIEF DESCRIPTION OF DRAWINGS

The above and other objects, features and advantages of the present disclosure will become more apparent from the following detailed description made with reference to the accompanying drawings. In the drawings:

FIG. 12A is an explanatory view that describes the state of an encoder and the state of the cancel energization, according to the one embodiment;

FIG. 12B is an explanatory view that describes the magnetization state of the stator and the state of the switching element, according to the one embodiment.

DETAILED DESCRIPTION

A shift range switching device is stopped within a stop allowable range by rotating a shaft through an external force such as a detent spring. In a situation where a motor with the use of a permanent magnet such as brushless motor is utilized, the cogging torque is generated through the rotor's rotation even when the energization is stopped. Therefore, the shaft may not be rotated to the stop allowable range depending on the relationship between the cogging torque and external force.

The shift range control apparatus according to one aspect of the present disclosure controls the driving of a motor in a shift range switching system. The shift range switching system includes a motor and a shift range switching mechanism. The motor includes a stator wound by a coil and a rotor rotated through the energization of a coil. The shift range switching mechanism includes a driven member, an engaging member and a pressing member. The driven member is formed with multiple recesses, and is driven by a motor. The engaging member is moveable between the recesses by the motor's drive, and fits into the recess according to the shift range. The pressing member presses the engaging member in a direction of the engaging member fitting into a recess. The shift range control apparatus includes a drive controller and a polarity determination device. The drive controller controls the driving of the motor so that the engaging member fits into the recess according to the shift range, in response to the shift range being switched. The polarity determination device determines the polarity of the stator facing the rotor.

The drive controller causes the engaging member moving to the recess according to the shift range, and then performs the cancel energization control to energize the coil with a cancellation current which is a current reducing the magnetic flux density of the stator according to the polarity of the stator. Since the magnetic attraction force between the stator and rotor decreases through the energization of the cancellation current for reducing the magnetic flux density of the stator, the cogging torque decreases.

The shift range control apparatus according to the present disclosure will be hereinafter explained with reference to the drawings.

Embodiment

Figure 1:
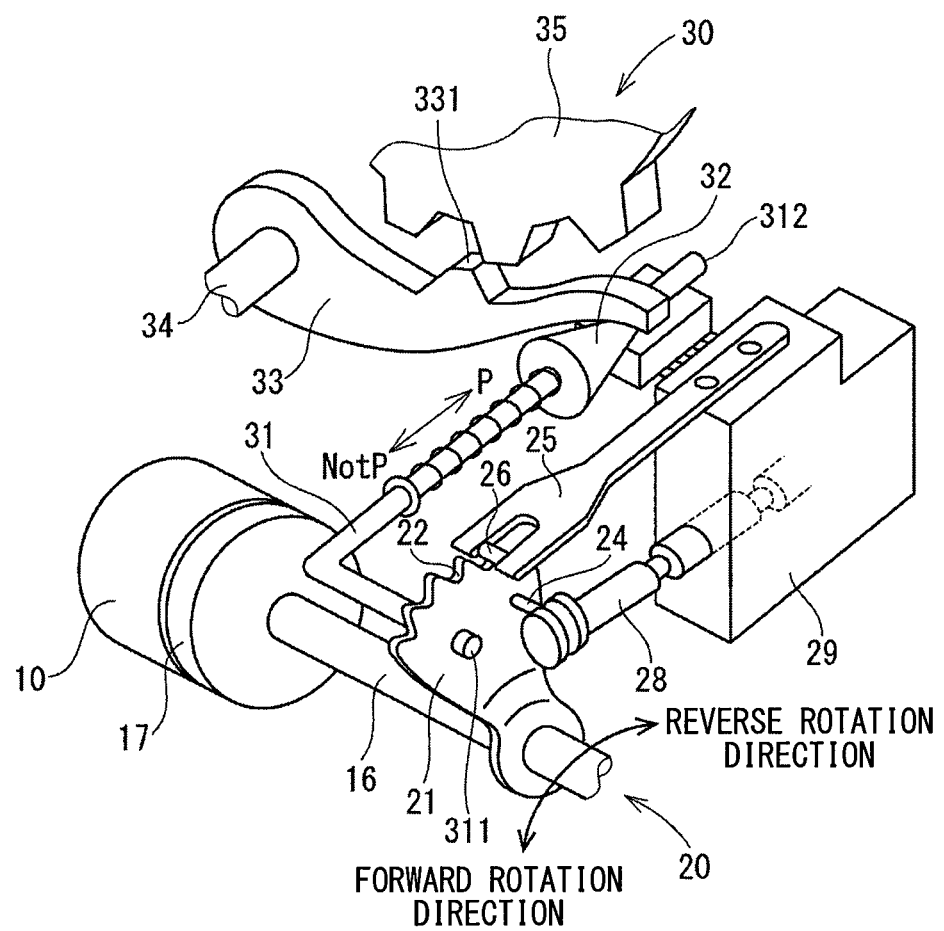
FIG. 1 is a perspective view showing a shift-by-wire system according to one embodiment.
Figure 2:
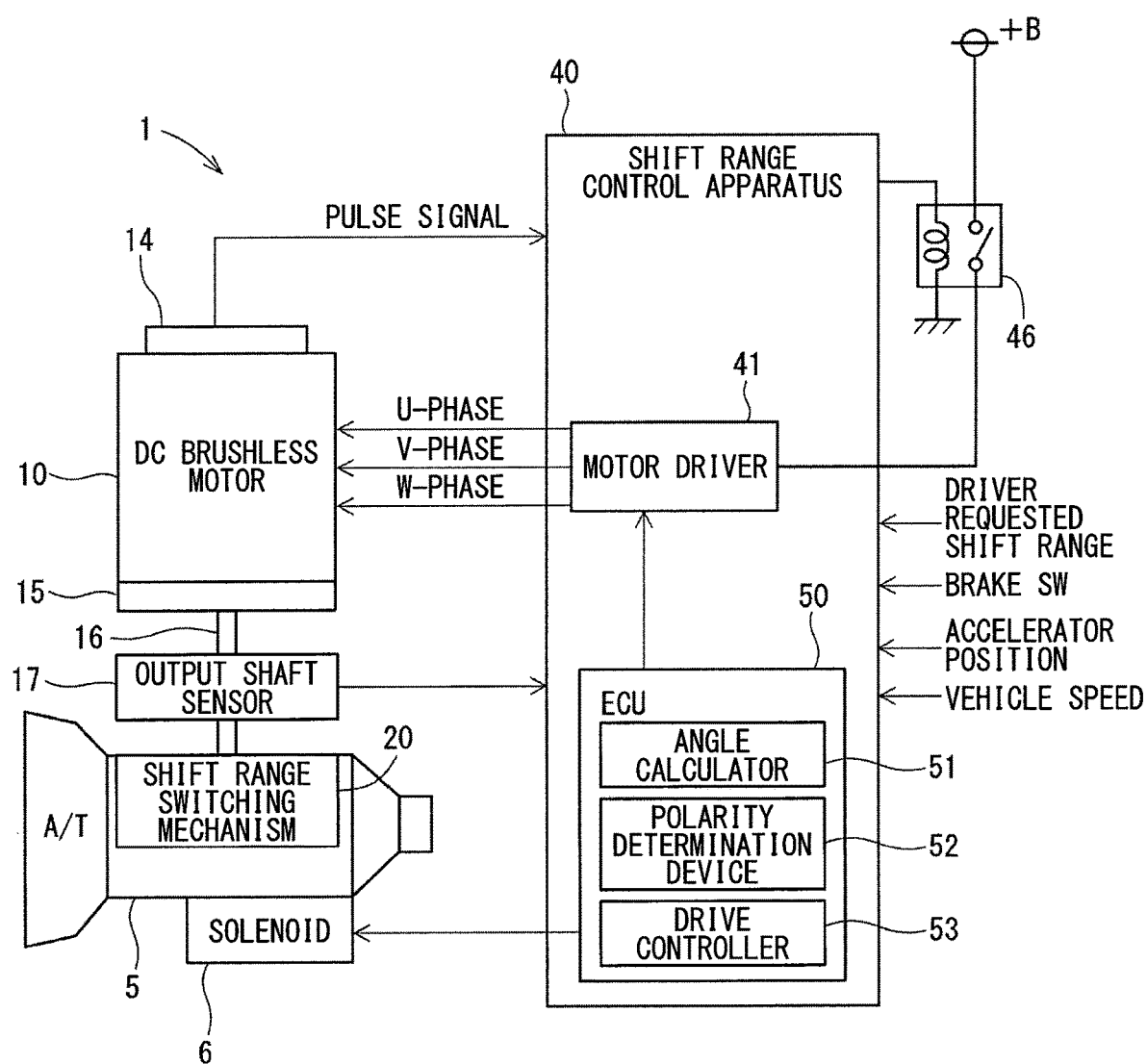
FIG. 2 is a block diagram showing a general configuration of the shift-by-wire system according to the one embodiment.

FIGS. 1 to 13 show a shift range control apparatus according to a first embodiment. As shown in FIGS. 1 and 2, a shift-by-wire system 1 includes, for example, a motor 10, a shift range switching mechanism 20, a parking lock mechanism 30, and a shift range control apparatus 40.

Figure 3:
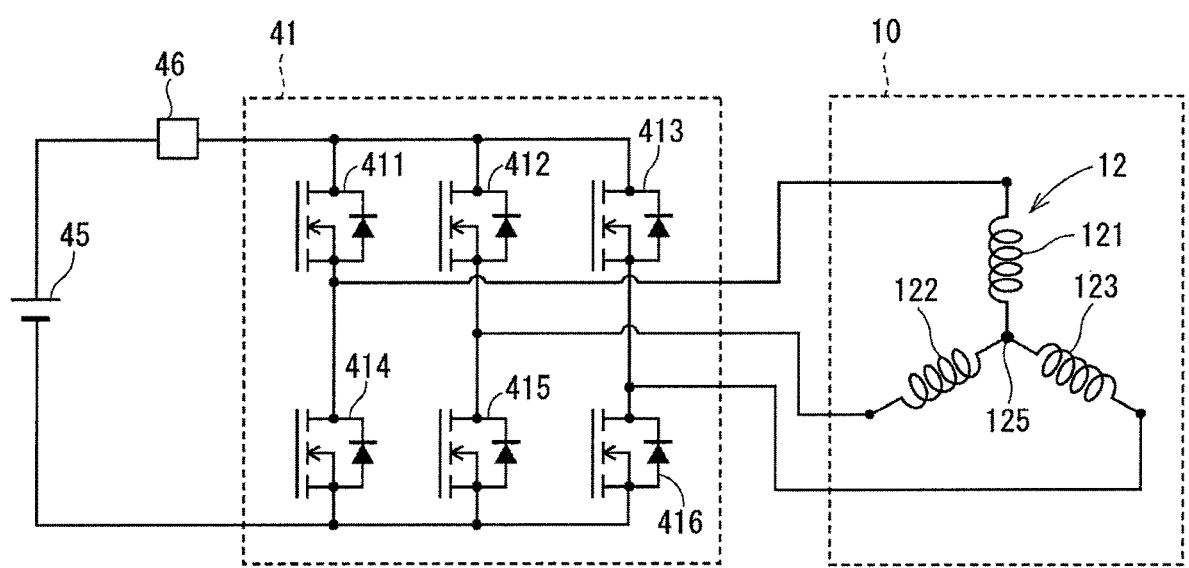
FIG. 3 is a circuit diagram showing a motor and a driver circuit according to the one embodiment.

As shown in FIGS. 1 to 3, the motor 10 is rotated by power supplied from a battery which is installed in a vehicle (not shown) and functions as a drive source of the shift range switching mechanism 20. The motor 10 of the present embodiment is a permanent magnet type DC brushless motor. As shown in FIG. 3 and FIG. 8B, the motor 10 includes, for example, a stator 11, a coil 12, and a rotor 13. The coil 12 is wound around the stator 11. The coil 12 includes a U-phased coil 121, a V-phased coil 122, and a W-phased coil 123. The rotor 13 rotates integrally with a motor shaft (not shown) when the coil 12 is energized. As shown in FIG. 8B, the number of slots of the stator 11 is 12, and the number of magnetic poles of the rotor 13 is 8.

As shown in FIG. 2, an encoder 14 detects a rotational position of a rotor (not shown) of the motor 10. The encoder 14 is a magnetic type rotary encoder and includes a magnet rotating with the rotor 13, Hall-effect integrated circuits (hereinafter referred to as Hall-effect ICs) 141 to 143 for detecting magnetic field (see FIG. 8B). The Hall-effect IC 141 is disposed at a position where the magnetic pole of the rotor 13 can be detected, for example, at a position facing the rotor of a casing (not shown) holding the stator 11. In the present embodiment, the Hall-effect IC 141 is provided at a position corresponding to the W-phase; the Hall-effect IC 142 is provided at a position corresponding to the U-phase; and the Hall-effect IC 143 is provided at a position corresponding to the V-phase. The encoder 14 outputs a pulse signal in synchronization with the rotation of the rotor 13.

A decelerator 15 is provided between the motor shaft of the motor 10 and the output shaft of the motor 10 to decelerate the rotation of the motor 10 and output rotation to the output shaft 16. The rotation of the motor 10 is thus transmitted to the shift range switching mechanism 20. An output shaft sensor 17 for detecting an angle of the output shaft 16 is provided on the output shaft 16. For example, the output shaft sensor 17 is a potentiometer.

As shown in FIG. 1, the shift range switching mechanism 20 includes a detent plate 21, a detent spring 25, and others, and transmits a rotational driving force output from the decelerator 15 to a manual valve 28 and the parking lock mechanism 30. The detent plate 21 is fixed to the output shaft 16 and driven by the motor 10. According to the embodiment, the direction in which the detent plate 21 moves away from the proximal end of the detent spring 25 is referred to as a forward rotation direction, and the direction in which the detent plate approaches the proximal end is referred to as a reverse rotation direction.

The detent plate 21 includes a pin 24 protruding in parallel with the output shaft 16. The pin 24 is connected to a manual valve 28. As the detent plate 21 is driven by the motor 10, the manual valve 28 reciprocates in the axial direction. That is, the shift range switching mechanism 20 converts the rotational motion of the motor 10 to the linear movement and transmits it to the manual valve 28. The manual valve 28 is provided to a valve body 29. The reciprocating movement of the manual valve 28 in the axial direction switches hydraulic pressure supply paths to a hydraulic clutch (not shown) to switch the engaged state of the hydraulic clutch, so that the shift range is switched. Four recesses 22 are placed on the side closer to the detent spring 25 of the detent plate 21, the four recesses 22 retain the manual valve 28 at positions corresponding to each shift range. The recesses 22 are formed in correspondence with the respective ranges of D, N, R, and P from the base portion side of the detent spring 25.

The detent spring 25 is a resiliently deformable plate-shaped member and a detent roller 26 is placed at the tip of the detent spring 25. The detent roller 26 fits into one of the recesses 22. The detent spring 25 presses the detent roller 26 toward a rotation center of the detent plate 21. When a rotation force being equal to or more than a predetermined level is applied to the detent plate 21, the detent spring 25 is deformed resiliently and the detent roller 26 moves to the recess 22. The detent roller 26 moves from one recess 22 to another recess 22. With the detent roller 26 fitted in one of the recesses 22, the pivoting motion of the detent plate 21 is restricted, the axial position of the manual valve 28 and the state of the parking lock mechanism 30 are determined. The shift range of an automatic transmission 5 is fixed.

The parking lock mechanism 30 includes a parking rod 31, a conical member 32, a parking lock pawl 33, a shaft part 34 and a parking gear 35. The parking rod 31 is substantially L-shaped, and a side of one end 311 is fixed to the detent plate 21. The conical member 32 is provided to a side of the other end 312 of the parking rod 31. The conical member 32 is formed so as to contract toward a side of the other end 312. As the detent plate 21 pivots in a reverse rotation direction, the conical member 32 moves toward a direction of an arrow P.

The parking lock pawl 33 is provided to abut on a conical surface of the conical member 32 and pivot around the shaft part 34. On a side of the parking gear 35 in the parking lock pawl 33, the parking lock pawl 33 has a protrusion 331 that can mesh with the parking gear 35. When the detent plate 21 rotates in the reverse rotation direction and the conical member 32 moves in the direction of arrow P, the parking lock pawl 33 is pushed up so that the protrusion 331 meshes with the parking gear 35. By contrast, when the detent plate 21 rotates in the forward rotation direction and the conical member 32 moves in the direction of arrow "NotP", the protrusion 331 is released from meshing with the parking gear 35.

The parking gear 35 is placed at an axle (not shown) so as to be capable of meshing with the protrusion 331 of the parking lock pawl 33. The parking gear 35 meshing with the protrusion 331 restricts the rotation of the axle. When the shift range is one of the ranges other than P (Not P range), the parking gear 35 is not locked by the parking lock pawl 33, so that the rotation of the axle is not stopped by the parking lock mechanism 30. When the shift range is the P range, the parking gear 35 is locked by the parking lock pawl 33 and the rotation of the axle is restricted.

As shown in FIGS. 2 and 3, the shift range control apparatus 40 includes, for example, a motor driver 41 and an ECU 50. The motor driver 41 is a three-phase inverter that switches energization of the coil 12, and is bridge-connected with switching elements 411 to 416. One end of the U-phase coil 121 is connected to a connection point between the pair of U-phase switching elements 411 and 414. One end of the V-phase coil 122 is connected to a connection point between the pair of V-phase switching elements 412 and 415. One end of the W-phase coil 123 is connected to a connection point between the pair of W-phase switching elements 423 and 426. The other ends of the coils 121 to 123 are connected at a connection portion 125. Although the coil 12 in the present embodiment is in Y-connection, a delta connection may also be used instead of the Y-connection.

While the switching elements 411 to 416 according to the present embodiment are MOSFETs, other devices such as IGBTs may also be used.

A motor relay 46 is placed between the motor driver 41 and the battery 45. While a starting switch such as an ignition switch is turned on, the motor relay 46 is turned on to supply electric power to a side of the motor 10. The motor relay 46 is turned off when the start switch is turned off, so that power supply to the motor 10 is shut down.

The ECU 50 controls the drive of the motor 10 by controlling on-off operation of the switching elements 411 to 416. Various processes in the ECU 50 may be software processes of a program preliminarily stored in a tangible memory device such as a ROM and executed by a CPU, or may be hardware processes executed by specialized electronic circuits. The ECU 50 controls the drive of a transmission hydraulic control solenoid 6 based on, for example, the vehicle speed, an accelerator position, and the driver-requested shift range. By controlling the transmission hydraulic control solenoid 6, the shift stage is controlled. The transmission hydraulic control solenoid 6 is provided in number in correspondence to the number of the shift ranges and the like. In the present embodiment, one ECU 50 controls the drive of the motor 10 and the solenoid 6. However, the ECU 50 may be divided into a motor ECU for motor control and an AT-ECU for solenoid control. Hereinafter, a drive control for the motor 10 will be mainly explained.

The ECU 50 includes, for example, an angle calculator 51, a polarity determination device 52, and a drive controller 53. The angle calculator 51 calculates the rotational angle of the motor 10 based on the detected value of the encoder 14. The polarity determination device 52 determines the polarity of the stator 11 based on the detected value of the encoder 14. The drive controller 53 controls the drive of the motor 10 by controlling on-off operation of the switching elements 411 to 416. Hereinafter, the rotation of the rotor 13 due to a change in the magnetic poles of the stator 11 caused by the energization of the coil is simply referred to as "the motor 10 rotates."

Figure 4A:
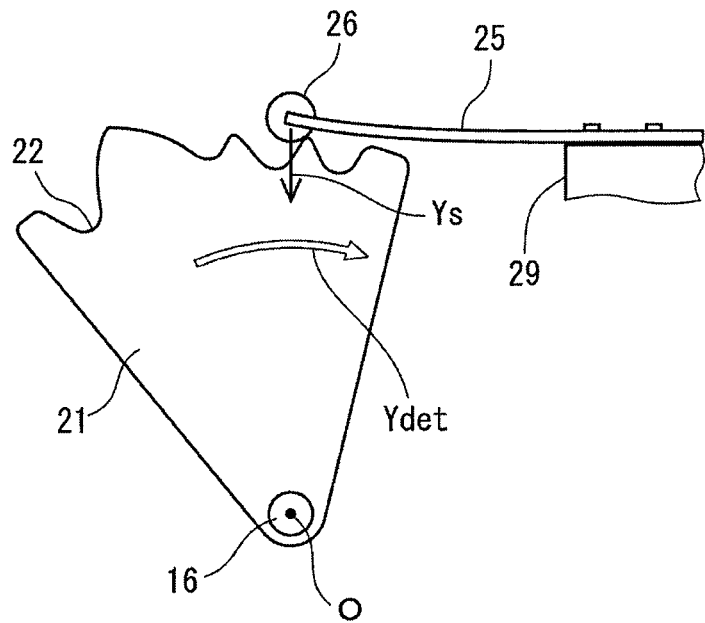
FIG. 4A is an explanatory view that describes a detent torque according to the one embodiment.
Figure 4B:
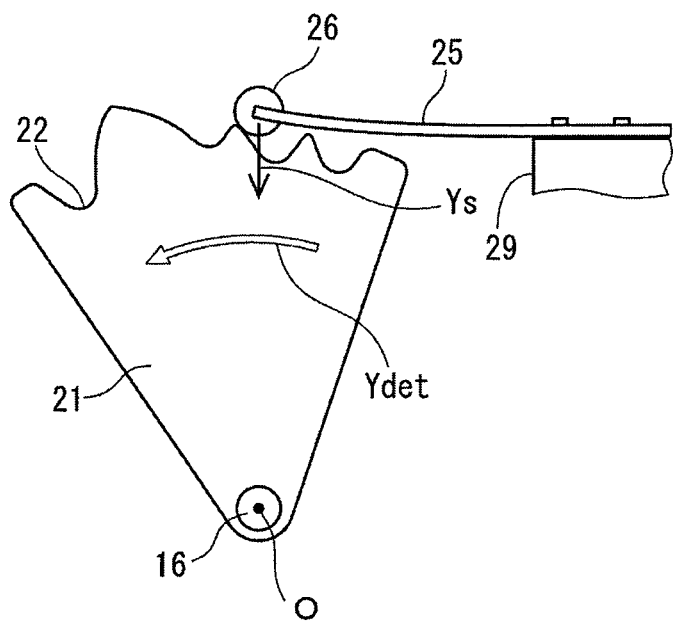
FIG. 4B is an explanatory view that describes a detent torque according to the one embodiment.

Prior to the explanation of the motor 10 performing the driving control, the spring force of the detent spring 25 is described based on FIGS. 4A and 4B. As described above, the detent plate 21 is provided to rotate integrally with the output shaft 16, and rotates along with the rotation of the motor 10. As the detent plate 21 rotates, the detent roller 26 moves to the recess 22 corresponding to a requested shift range. As indicated by the arrow Ys in FIGS. 4A and 4B, the detent spring 25 presses the detent roller 26 in the direction of the rotation center O of the detent plate 21, in other words, in the direction toward the bottom of the recess 22. Therefore, the detent roller 26 is located at a position other than the bottommost portion of the recess 22, the detent torque Tdet occurs at the detent plate 21. The detent torque is indicated by the arrow Ydet in FIGS. 4A and 4B.

Specifically, as shown in FIG. 4A, when the detent roller 26 is positioned closer to the base of the detent spring 25 than the bottommost portion of the recess 22, the detent torque Tdet that rotates the detent plate 21 in the reverse rotation direction occurs. As shown in FIG. 4B, when the detent roller 26 is positioned farther from the base of the detent spring 25 than the bottommost portion of the recess 22, the detent torque Tdet that rotates the detent plate 21 in the forward rotation direction occurs.

Figure 5:
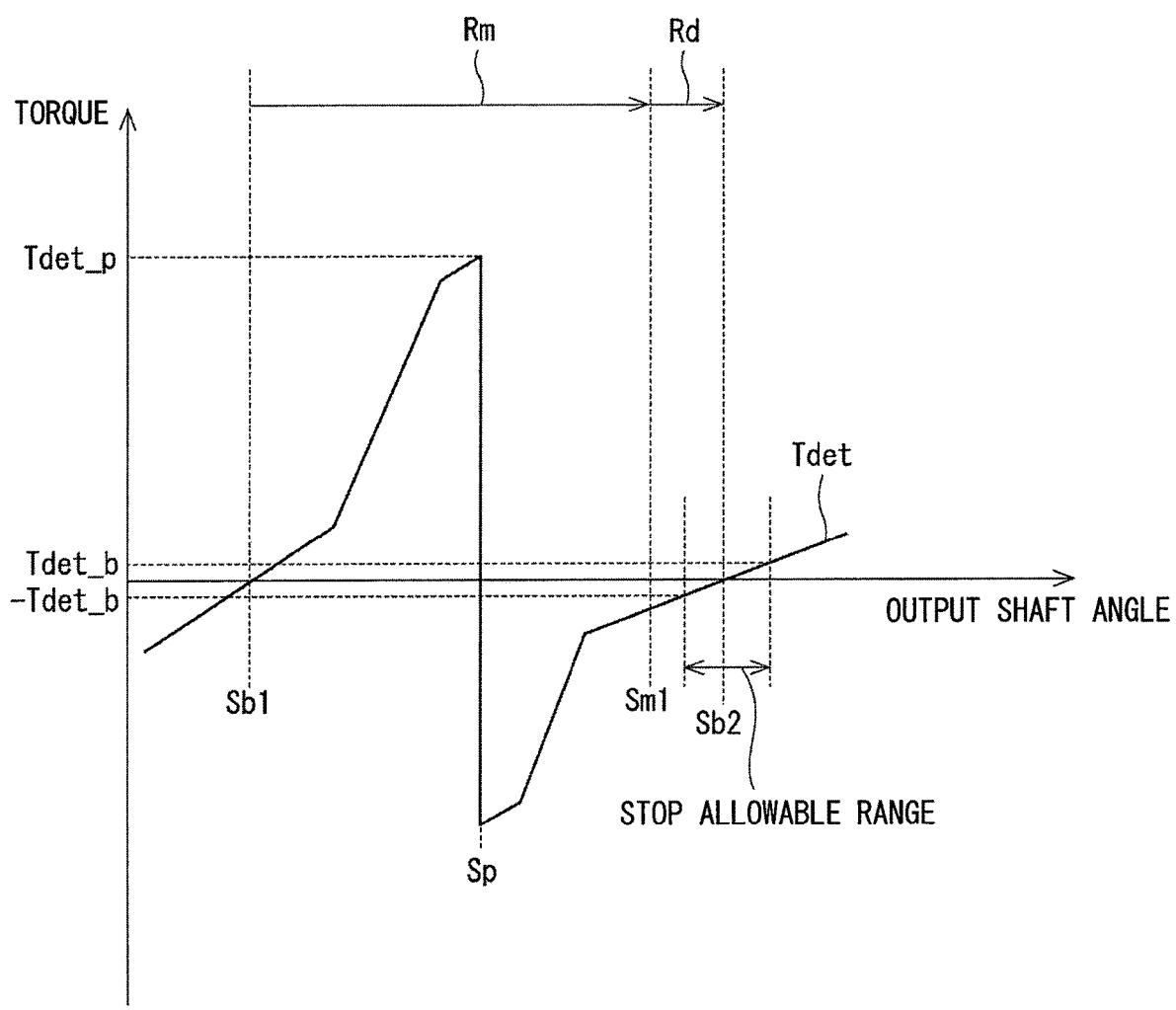
FIG. 5 is an explanatory view that describes the relationship between the output shaft angle and the detent torque according to the one embodiment.
Figure 6:
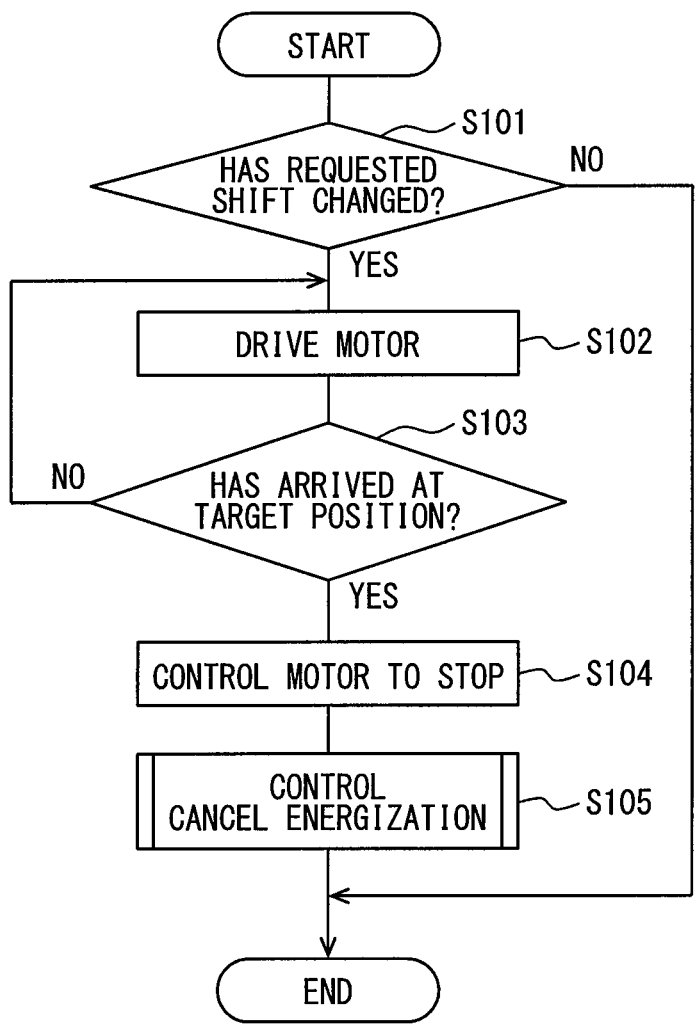
FIG. 6 is a flowchart that describes a motor driving process according to the one embodiment.

As shown in FIG. 5, the detent torque Tdet is at a maximum value when the detent roller 26 is at the peak position between the recesses of the detent plate 21, and is at a zero value when the detent roller 26 is at the lowest position of the recess 22. The relationship between the output shaft angle and the detent torque Tdet corresponds to, for example, the spring force of the detent spring 25 or the shape of the detent plate 21. In FIG. 5, the output shaft angles in a situation where the detent roller 26 is at the lowest position of the recess 22 are equal to Sb1 and Sb2. The output shaft angle in a situation where the detent roller 26 is located at the peak position between the recesses is equal to Sp.

When the output shaft 16 rotates from the angle Sb1 to the angle Sb2 to move the detent roller 26 to the adjacent recess 22, it is required to drive the output shaft 16 at a torque larger than a peak detent torque Tdet_p, which is the detent torque at the angle Sp. That is, the peak detent torque Tdet_p may also be regarded as the minimum driving torque of the motor 10 at the time of shift range switching.

As shown by the arrow Rm, the motor 10 drives the output shaft 16 to rotate in the section from the angle Sb1 to the angle Sm1. The motor 10 is stopped at the angle Sm1 to stop the energization. In a situation where the motor 10 does not generate the cogging torque Tcgg, as shown by the arrow Rd, the output shaft 16 rotates to the stop allowable range with the detent torque Tdet, and the detent roller 26 fits into the bottommost portion of the recess 22. FIG. 5 shows the arrow Rd rotating to the angle Sb2 with the detent torque Tdet. It is noted that "the bottommost portion" is a range corresponding to the stop allowable range of the output shaft 16. The maximum value of the detent torque in the stop allowable range is the allowable torque±Tdet_b. On the other hand, when the cogging torque Tcgg of the motor 10 is larger than the allowable torque Tdet_b, the detent roller 26 cannot fit into the bottommost portion of the recess 22 in a situation where the energization of the motor 10 is stopped outside the stop allowable range.

In the present embodiment, the motor 10 is the DC brushless motor. The cogging torque Tcgg of the motor 10 may be larger than the allowable torque Tdet_b. When the pressing force of the detent spring 25 increases to enlarge the detent torque Tdet, the peak detent torque Tdet_p also increases. Thus, it is also required to increase the driving torque for passing the peak between the recesses 22 while increasing the size of the motor 10.

In the present embodiment, when the motor 10 has stopped to excite a current for reducing the cogging torque Tcgg, the detent roller 26 fits into the bottommost portion of the recess 22. The motor driving processing according to the present embodiment is described with reference to flowcharts of FIG. 6 and FIG. 7. This process is performed on predetermined cycles by the ECU 50 during a period in which the starter switch such as an ignition switch is turned on. Hereinafter, the symbol "S" is simply referred to "Step" for Step S101. The same applies to the other steps.

In S101, the ECU 50 determines whether the requested shift range has been changed. When it is determined that the requested shift range has not been changed (S101: NO), the process in S102 and the processes subsequent to S102 are not performed. When it is determined that the requested shift range has been changed (S101: YES), the process shifts to S102. In S102, the drive controller 53 drives the motor 10 to rotate to a target position according to the requested shift range and to stop at the target position. The motor control herein may be any control method such as current feedback control or speed feedback control.

In S103, the ECU 50 determines whether the motor 10 has reached the target position. When it is determined that the motor 10 has not reached the target position (S103: NO), the process returns to S102 and the driving of the motor 10 is continued. When it is determined that the motor 10 has reached the target position (S103: YES), the process shifts to S104. In S104, the drive controller 53 performs motor stop control to stop the motor 10. In the present embodiment, the motor stop control is configured such that two phases are selected corresponding to the rotor position of the motor as stationary phases and stationary phase energization control is performed by energizing the stationary phases. In S105, the drive controller 53 has been performing the motor stop control for a predetermined time and then performs cancel energization processing for reducing the cogging torque.

Figure 7:
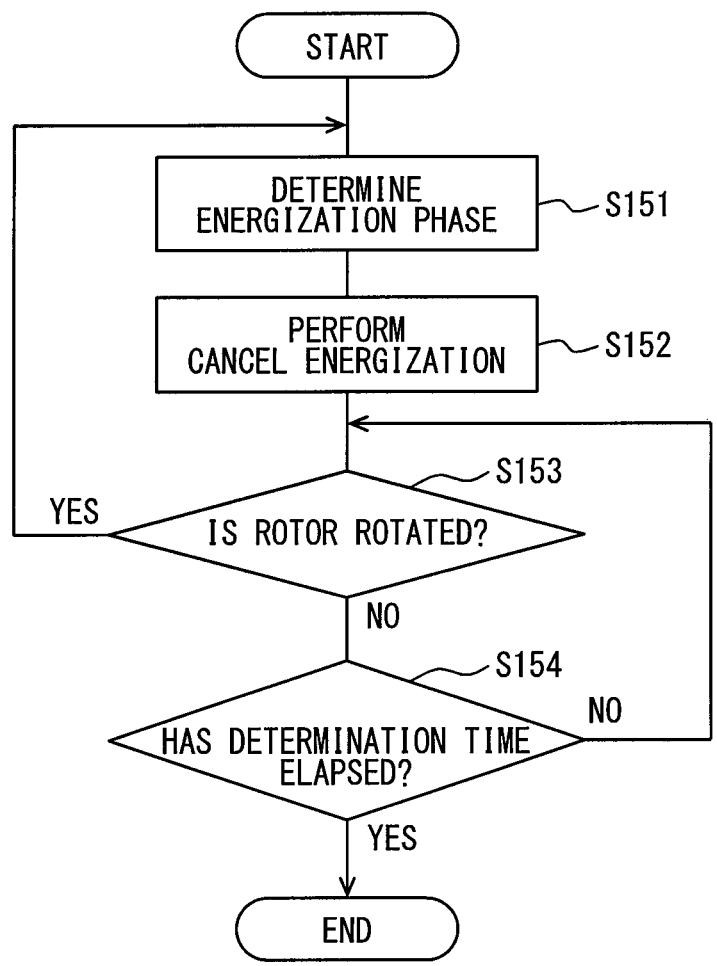
FIG. 7 is a flowchart that describes a cancel energization process according to the one embodiment.

FIG. 7 shows a flow of a cancel energization process. In S151, the polarity determination device 52 determines the energization phase based on the detected value of the encoder 14. The polarity determination device 52 determines the energization phase of the cancellation current as a current to reduce the magnetic flux density at the current energization state. The relationship between the state of the Hall-effect ICs 141 to 143 of the encoder 14 and the energization phase of the cancellation current is illustrated in FIG. 12A. The relationship between the energization phase and the switching states of the switching elements 411 to 416 is illustrated in FIG. 12B. For example, in state 1 of FIG. 12A, since the Hall-effect IC 141 is N; the Hall-effect IC 142 is N; and the Hall-effect IC 143 is S, the cancel energization is performed so that the U-phase corresponds to N and the V-phase corresponds to S. The switching elements 411 and 415 are turned on, since the switching pattern is at <6> in which the U-phase is N and the V-phase is S, as shown in FIG. 12B. In FIG. 12B, the switching element is written as "SW."

In S152, the drive controller 53 applies the cancellation current to the coil 12. In S153, the ECU 50 determines whether the rotor 13 has rotated based on the detected value of the encoder 14. When it is determined that the rotor 13 has rotated (S153: YES), the energization phase is switched and then the cancel energization is performed. When it is determined that the rotor 13 is not rotating (S153: YES), the process shifts to S154.

In S154, the ECU determines that whether the determination time has been elapsed when the rotor 13 stops. When it is determined that the determination time has not been elapsed (S154: NO), the process shifts to S153. When it is determined that the determination time has been elapsed (S154: YES), the cancel energization control is terminated and the energization of the motor 10 is turned into an off state.

Figure 9A:
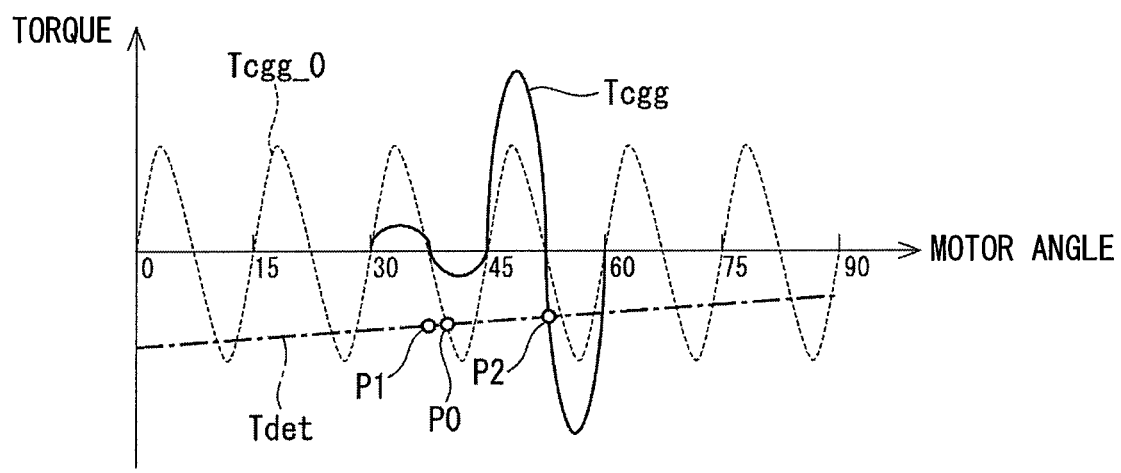
FIG. 9A is an explanatory view that describes the relationship between the cogging torque and detent torque at the time of cancel energization process after stationary phase energization according to the one embodiment.
Figure 9B:
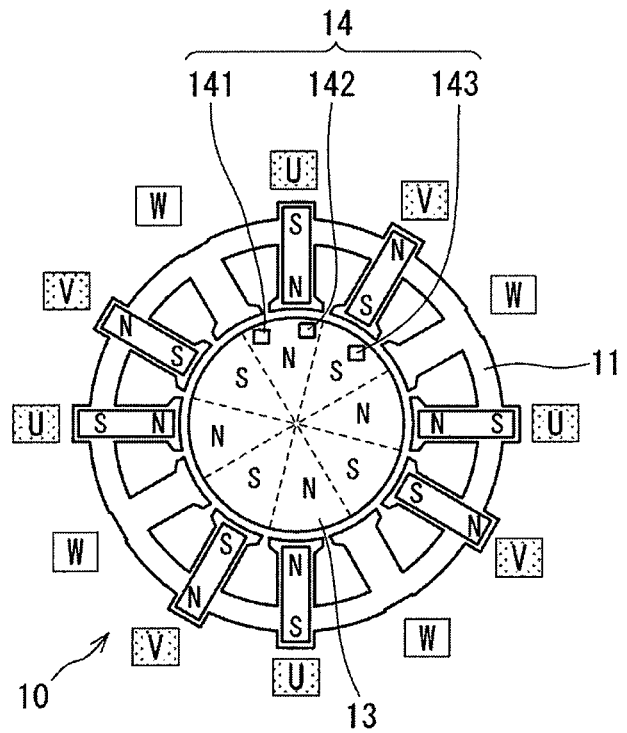
FIG. 9B is an explanatory view that describes the magnetization state of the motor at the time of the cancel energization process after stationary phase energization according to the one embodiment.
Figure 10A:
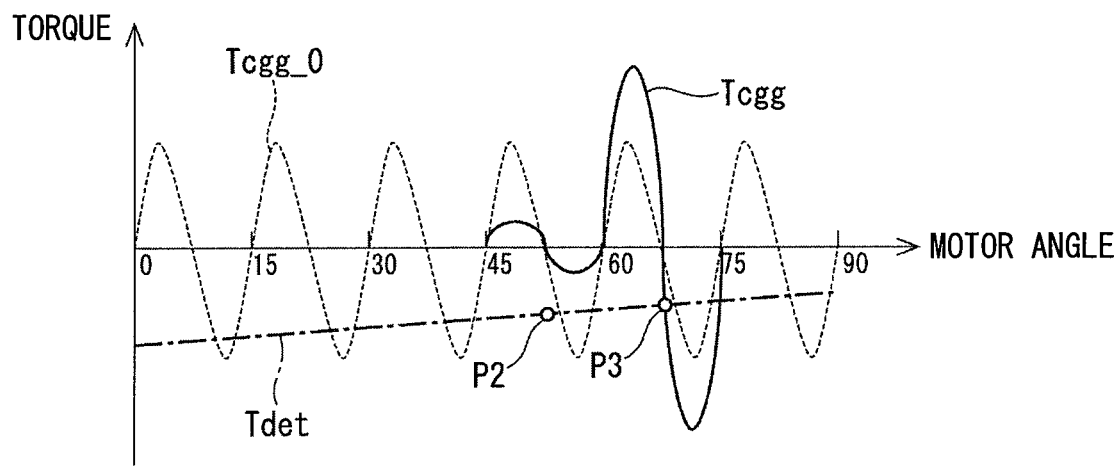
FIG. 10A is an explanatory view that describes the relationship between the cogging torque and detent torque at the time of switching the energization phase according to the one embodiment.
Figure 10B:
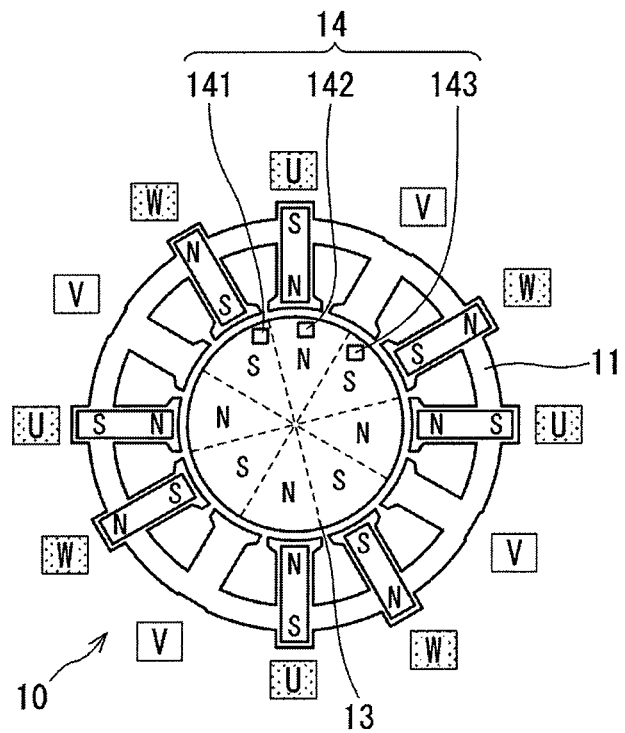
FIG. 10B is an explanatory view that describes the magnetization state of the motor at the time of switching the energization phase according to the one embodiment.

The behavior of the motor 10 through the cancel energization processing will be described based on FIGS. 8A to 11. In FIGS. 8A, 9A, 10A and 11, the horizontal axis represents the motor angle (°), which is the mechanical angle of the motor; and the vertical axis represents torque. The solid line in the above-mentioned drawings represents the cogging torque Tcgg occurred at the current energization state. The broken line represents the cogging torque Tcgg0 when the energization is turned off. The dashed-dotted line represents the detent torque Tdet. With regard to the cogging torque Tcgg in the current energization state, a part of the angular range including the motor stop position is described, and the other angular range is omitted. In the description of FIGS. 8A, 9A, 10A and 11, the cogging torques Tcgg and Tcgg0 are values converted into gear ratios. FIGS. 8B, 9B and 10B illustrate the relationship between the magnetization state of the stator 11 and the position of the rotor 13. In the above-mentioned drawings, the phase indicated by the satin is an energization phase. In the following, the magnetic pole on the side facing the rotor 13 is used as the magnetic pole of the stator 11 of each phase. FIGS. 8A to 11 exemplarily describe a numerical value of the motor angle to illustrate the rotation of the motor shaft through the switching of the energization phases. The numerical value corresponds to an energization phase at the time of the stationary phase energization.

Figure 8A:
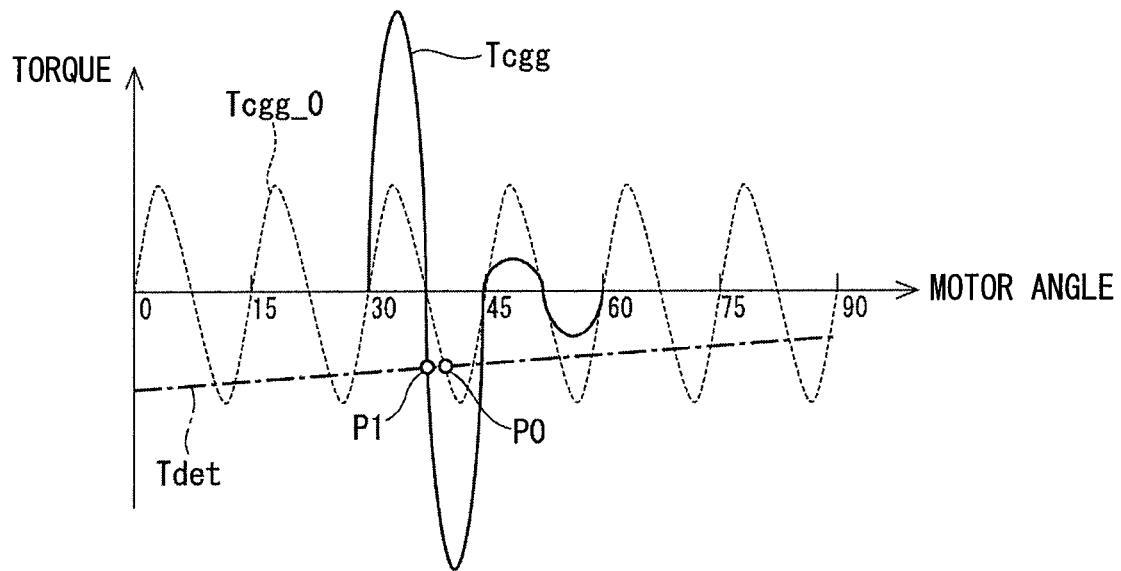
FIG. 8A is an explanatory view that describes the relationship between the cogging torque and detent torque at the time of stationary phase energization according to the one embodiment.
Figure 8B:
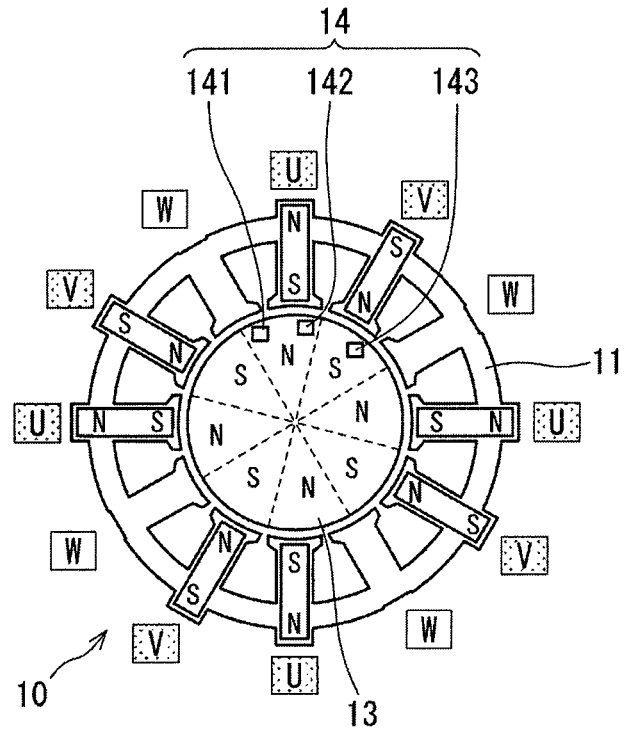
FIG. 8B is an explanatory view that describes the magnetization state of the motor at the time of stationary phase energization according to the one embodiment.

FIGS. 8A and 8B illustrate the state at the time of stationary phase energization. As shown in FIG. 8B, the U-phase of the stator 11 is magnetized to an S-pole, and the V-phase of the stator 11 is magnetized to an N-pole. The N-pole of the rotor 13 attracts the U-phase, and the S-pole of the rotor 13 attracts the V-phase. The cogging torque Tcgg illustrated by the solid line occurs at the motor 10. The detent torque acts on the motor 10 through the decelerator 15 as described in FIGS. 4A and 4B. Therefore, the motor 10 stops at a position P1 where the cogging torque Tcgg and the detent torque Tdet are balanced out to each other.

In a situation where a permanent magnet is not used such as an SR motor, the detent torque Tdet can move the detent roller 26 to the bottommost portion of the recess 22 when the energization is turned off. In the present embodiment, the motor 10 is a DC brushless motor, and a permanent magnet is provided at the rotor 13. Thus, the cogging torque Tcgg indicated by a broken line remains even when the energization is turned off. Although the motor 10 moves to a position P0 where the detent torque Tdet the cogging torque Tcgg are balanced out to each other, the motor 10 cannot move further. The detent roller 26 cannot move to the stop allowable range of the recess 22.

In the present embodiment, cancel energization is performed to cancel the cogging torque Tcgg at the stopping position of the rotor 13. In particular, as shown in "State 1" of FIGS. 9A, 9B and 12A, the energization is performed so that the U-phase, which has been magnetized to the S-pole, is to be magnetized to the N-pole, and the V-phase, which has been magnetized to the N-pole, is to be magnetized to the S-pole during the stationary phase energization. That is, in the initial cancel energization, the stator 11 is energized such that the polarity of the stator 11 is in reverse to that in the stationary phase energization. For the initial cancel energization, in a situation where the energization phase is internally known, the detected value of the encoder 14 may not be used to determine the cancel energization phase.

The cogging torque Tcgg is smaller than the driving torque for driving the motor 10 and the torque for stopping the motor 10 at the stationary phase energization. In the cancel energization control, it is sufficient to cancel the cogging torque Tcgg. Therefore, the amount of energization to be used for cancel energization is sufficiently smaller as compared to the motor driving control and stopping control. The amount of energization is a design value determined according to the shape and characteristics of the motor 10. The present embodiment decides the amount of energization so that the magnetic flux density reaches zero. Since it is sufficient to reduce the cogging torque Tcgg, it is not necessarily to set the amount of energization so that the magnetic flux density reaches zero.

When the attraction force between the stator 11 and the rotor 13 is weakened by the cancel energization, the output shaft 16 and the rotor 13 rotate through the detent torque Tdet. The rotor 13 rotates from the position P1 at the time of stationary phase energization, and again stops at the position P2 where the detent torque Tdet the cogging torque Tcgg are balanced out to each other. In the present embodiment, the number of slots of the stator 11 is 12, and the number of magnetic poles of the rotor 13 is 8. Therefore, the rotor 13 is rotated by about 15° through the cancel energization. As described above, the motor 10 stops at a location where the cogging torque Tcgg intersects the detent torque Tdet, the amount of rotation through the cancel energization does not exactly reach 15°, and a shift according to the torque occurs.

When the cancel energization is performed as shown in FIG. 9B, the rotor 13 rotates and stops at the state shown in FIG. 10B. The encoder 14 at this time is in the "state 2" of FIG. 12A. Therefore, the energization phase is shifted by one phase, the U-phase remains as the N-pole, and the cancel energization phase is switched so that the W-phase is the S-pole instead of the V-phase. Therefore, the motor 10 rotates from the position P2 to the position P3 and stops (see FIG. 10A). In the present embodiment, the cogging torque Tcgg at the stopping position of the motor 10 is reduced by switching the cancel energization phase to the state 1, state 2, state 3 . . . , and the motor 10 rotates to the stop allowable range through the detent torque Tdet. As a supplement, FIG. 9B shows the state of starting cancel energization and the state prior to the rotor rotation when the output shaft 16 is at the position P1, and FIG. 10B shows the state of starting cancel energization and the state prior to the rotor rotation when the output shaft 16 is at the position P2.

Figure 11:
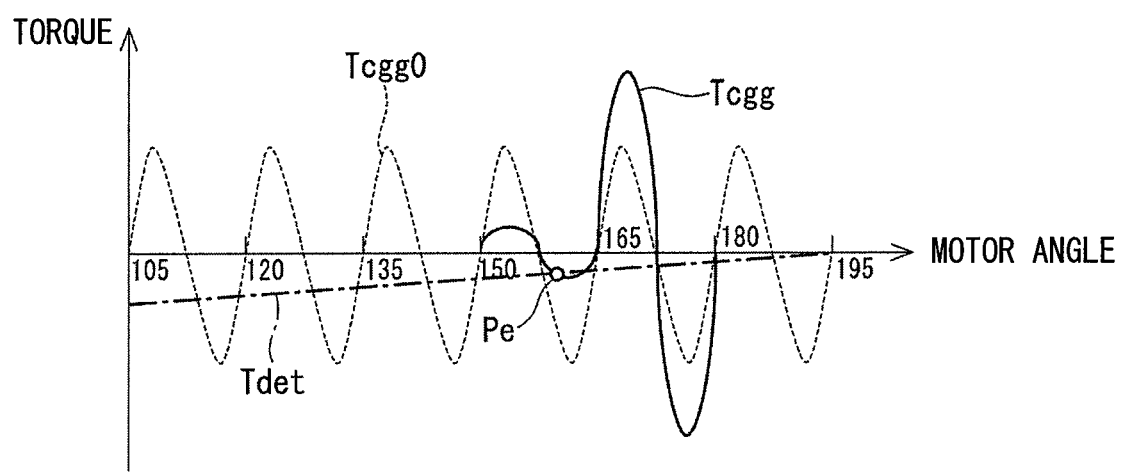
FIG. 11 is an explanatory view that describes the relationship between the cogging torque and detent torque at the time of terminating the cancel energization control according to the one embodiment.

As shown in FIG. 11, the motor 10 does not rotate from the position Pe, in a situation where the cogging torque Tcgg does not fall below the detent torque Tdet even if the cancel energization is performed. In the present embodiment, in a situation where the determination time has been elapsed without having a change in the count value of the encoder 14 after switching the energization phase through cancel energization, it is assumed that the cancel energization does not cause the motor 10 to rotate. All of the switching elements 411 to 416 are turned off so that the control is terminated. At this time, when the detent torque Tdet is smaller than the allowable torque Tdet_b, the output shaft 16 is within the stop allowable range, and the detent roller 26 fits into the bottommost portion of the recess 22 according to the requested shaft range.

In the present embodiment, the shift-by-wire system 1 drives the motor 1—to rotate the detent plate 21, and the energization force of the detent spring 25 causes the detent roller 26 to drop into the recess 22 corresponding to the shift range. In other words, the shaft position of the driven member, which is driven by the rotation of the motor 10, is stabilized and held by the external force of the mechanism (for example, the energization force of the detent spring 25 in the present embodiment). In such a configuration, when the cogging torque Tcgg of the motor 10 is larger, the pressing force of the detent spring 25 may prevent the detent roller 26 from being dropped into the desired recess 22. When the pressing force of the detent spring 25 is enlarged to increase the detent torque Tdet, it is necessary to also increase the driving torque required to cause the detent roller 26 to climb over the ridge between the recesses 22. Thus, it is needed to enlarge the size of the motor 10.

The present embodiment controls the motor 10 to stop after rotating the motor 10 to a position where the detent roller 26 is near the center of the recess 22 corresponding to the shift range, when the shift range is switched. After the motor 10 stops, the present embodiment performs the cogging cancellation processing by conducting a smaller current as compared with the time of motor control to decrease the cogging torque Tcgg at the stopping position of the motor 10. When the cogging torque Tcgg decreases through the cogging cancellation processing, the detent torque Tdet causes the detent plate 21 and the output shaft 16 to rotate, and the detent torque Tdet also causes the motor 10 to rotate through the decelerator 15 and to stop at a position where the detent torque Tdet matches the cogging torque Tcgg. The energization phases are switched according to the rotation direction and the rotation amount of the motor 10, and the cancel energization is again performed. The detent torque Tdet can move the detent roller 26 toward the bottommost portion of the recess by repeating the cancel energization according to the rotor position.

Even though the cogging cancellation processing is not performed, the motor 10 does not rotate in a situation where the cogging torque Tcgg is not equal to or less than the detent torque Tdet. At this time, the detent torque Tdet sufficiently decreases, and the detent roller 26 moves within the stop allowable range. The present embodiment terminates the cogging cancellation processing, when the cogging cancellation processing does not cause the motor 10 to rotate. Thus, the detent roller 26 can be properly moved to the desired recess 22 and the output shaft 16 can be stably held, without enlarging the size of the motor 10.

Figure 13:
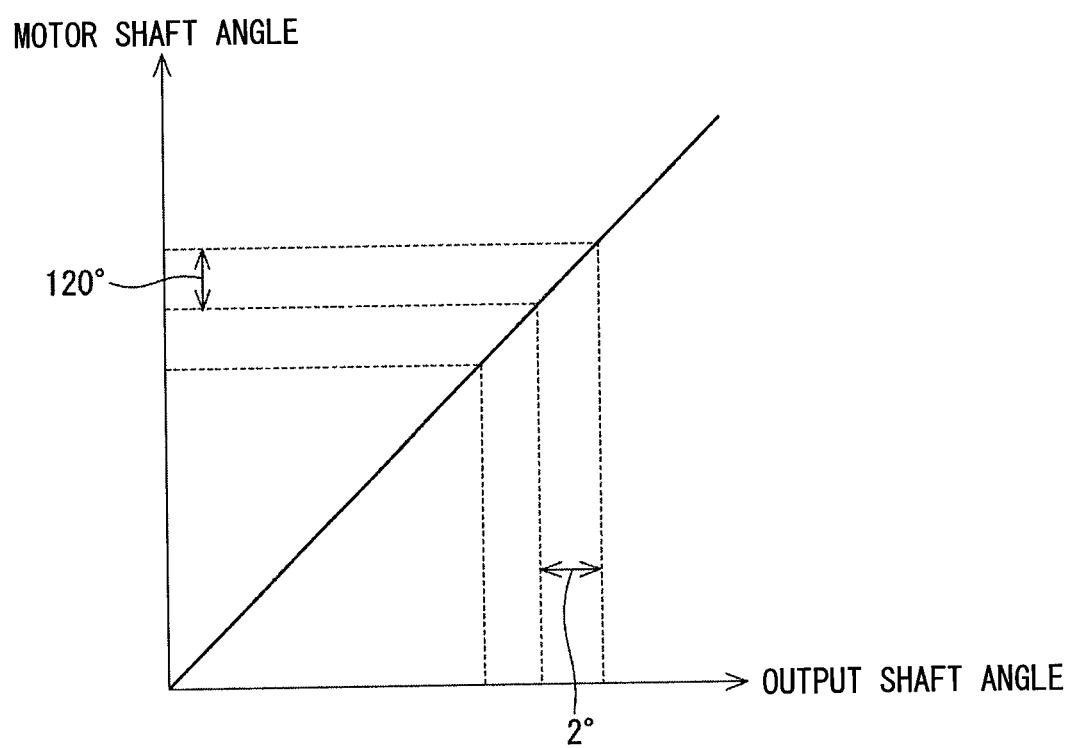
FIG. 13 is an explanatory view that describes the relationship between output shaft angle and the motor shaft angle, according to the one embodiment.

In the present embodiment, the decelerator 15 is placed between the motor shaft of the motor 10 and the output shaft. As shown in FIG. 13, for example, when the deceleration ratio DR is 60 times, it is required to rotate the motor shaft by 120° in order to rotate the output shaft 16 by 2°. In the present embodiment, the motor shaft and the rotor 13 rotate about 15° based on the relationship between the number of slots of the stator 11 and the number of magnetic poles of the rotor 13. Therefore, it is required to switch the energization state 8 times to rotate the output shaft 16 by 2°. In other words, the number of times of switching energization phases increases as the deceleration ratio increases.

When the decelerator 15 is provided, it is required to satisfy the following equation (1) to drive the motor shaft through the detent torque Tdet.

$$Tcgg \times DR < Tdet \qquad (1)$$

In other words, if the above-mentioned equation (1) is not satisfied, the motor shaft cannot be rotated through the detent torque Tdet so that it is likely that the detent roller 26 does not fall into the desired recess 22. When the deceleration increases, the influence of the cogging torque Tcgg also increases. Accordingly, it is effective to perform the cogging cancellation process according to the present embodiment to cancel the cogging torque Tcgg.

As described above, the shift range control apparatus 40 according to the present embodiment controls the motor 10 to drive for switching the shift range in the shift-by-wire system 1. The shift-by-wire system 1 includes the motor 10 and a shift range switching mechanism 20.

The motor 10 includes: the stator 11 around which the coil 12 is wound; and a rotor 13 which rotates through the energization of the coil 12. A permanent magnet is provided at the rotor 13. The shift range switching mechanism 20 includes the detent plate 21, the detent roller 26 and the detent spring 25. A plurality of recesses 22 are formed at the detent plate 21. The detent plate 21 is driven by the motor 10. The detent roller 26 is movable between the recesses 22 through the driving of the motor 10. The detent roller 26 fits in the recess 22 according to the shift range. The detent spring 25 presses the detent roller 26 in a direction which the detent roller 26 fits into the recess 22.

The shift range control apparatus 40 includes a drive controller 53 and a polarity determination device 52. The drive controller 53 controls the driving of the motor 10 so that the detent roller 26 fits into the recess 22 according to shift range, when the shift range is switched. The polarity determination device 52 determines the polarity of the stator 11 facing the rotor 13. The drive controller 53 performs the cancel energization control to provide a cancellation current according to the polarity of the stator 11 after moving the detent roller 26 to the recess 22 according to the shift range. The cancellation current is a current for reducing the magnetic flux of the stator 11. The magnetic attraction force between the stator 11 and the rotor 13 is reduced through the energization of the cancellation current for reducing the magnetic density of the stator 11. Therefore, the cogging torque Tcgg can be reduced.

In the present embodiment, since the permanent magnet is provided at the rotor 13, the detent roller 26 may not drop to the bottommost portion of the recess 22 through the detent torque Tdet due to the influence of the cogging torque Tcgg even through the energization of the motor 10 stops. In the present embodiment, the cogging torque is reduced by performing the cancel energization control. Thus, the detent roller 26 can be moved properly to the bottommost portion of the recess 22 by the pressing force of the detent spring 25.

In particular, as in the present embodiment, the decelerator 15 is provided between the motor 10 and the detent plate 21. When the deceleration ratio DR increases, the influence of the cogging torque Tcgg also increases. Therefore, it is effective to perform the cancel energization control according to the present embodiment to reduce the cogging torque Tcgg.

When the rotor 13 rotates through the energization of the cancellation current, the drive controller 53 changes the energization phase of the cancellation current. The detent roller 26 can be properly moved toward the bottommost portion of the recess 22 by switching the energization phase while repeating energization of the cancellation current. In particular, as in the present embodiment, the decelerator 15 is provided between the motor 10 and the detent plate 21. It is effective to repeat the cancel energization since the amount of rotation of the detent plate 21 decreases by one-time cancel energization when the deceleration ratio increases. The drive controller 53 terminates the energization of the coil 12 in a situation where the rotor 13 does not rotate through the energization of the cancellation current. Therefore, the cancel energization control can be properly terminated.

In the present embodiment, the shift-by-wire system 1 corresponds to the "shift range switching system"; the detent plate 21 corresponds to the "driven member"; the detent roller 26 corresponds to the "engaging member"; and the detent spring 25 corresponds to the "pressing member."

Other Embodiments (1) Motor

In the embodiment described above, the motor is the DC brushless motor. In other embodiments, any motor may be used with the use of the permanent magnet. The motor has a set of coils. In other embodiments, two or more sets of coils may be provided. In the embodiment as described above, the number of slots of the stator is 12, and the number of magnetic poles of the rotor is 8. In the other embodiments, the number of slots and the number of magnetic poles can be set as appropriate. In the present embodiment, the rotor rotates about 15° through one-time cancel energization. However, the angle of rotation through one-time cancel energization may be an angle corresponding to the number of slots and the number of magnetic poles.

In the embodiment as described above, the encoder detects the rotation of the motor. The number of Hall-effect ICs in the encoder is 3. In other embodiments, the number of Hall-effect ICs may be two as long as the relationship between the count value of the encoder and the rotor position is learned by, for example, a wall rest. Further, with regard to the cancel energization control, the control can be performed if the rotational direction and the amount of rotation after the stop of the rotor are known. Therefore, two Hall-effect ICs may be provided. Four or more Hall-effect ICs may also be provided. In other embodiments, the rotor's rotation may also be detected by a device other than an encoder such as a resolver.

(2) Decelerator

Although the details of the decelerator are not described in the embodiment described above, it may be configured by using, for example, a cycloid gear, a planetary gear, a spur gear that transmits torque from a reduction mechanism substantially coaxial with the motor shaft to a drive shaft, or any combination of these gears. In other embodiments, the decelerator between the motor and the driven member may be omitted.

(3) Shift Range Switching Mechanism

In the embodiments described above, the four recesses are formed in the detent plate as the driven member. According to the other embodiments, the number of the recesses is not limited to four, and may be any number. For example, two recesses corresponding to P-range and not P-range, which is different from the P-range, may be formed. In other embodiments, the respective shapes of the driven member, the engaging member and the pressing member may be different from the ones in the embodiment described above. The present disclosure is not limited to the embodiments described herein. The present disclosure may be practiced in various modes without departing from the scope and spirit of the disclosure.

The present disclosure has been described in accordance with the embodiments. However, the present disclosure is not limited to such embodiments and structures. The present disclosure also encompasses various modifications and variations within the scope of equivalents. Also, various combinations and forms, as well as other combinations and forms that include only one element, more, or less, are within the scope and spirit of the present disclosure.

The invention claimed is:

1. A shift range control apparatus comprising:
   a drive controller configured to control a shift range switching system; and
   a polarity determination device,
   wherein the shift range switching system includes a motor and a shift range mechanism,
   wherein the motor includes:
      a stator that is wound by a coil; and
      a rotor that is rotated by an energization to the coil,
   wherein the shift range switching mechanism includes:
      a driven member that has a plurality of recesses and is driven by the motor;
      an engaging member that is movable between the recesses through the driving of the motor and fitting into corresponding one of the recesses according to a shift range; and
      a pressing member that presses the engaging member in a direction of fitting the engaging member into the corresponding one of the recesses,
   wherein the polarity determination device is configured to determine a polarity of the stator facing the rotor,
   wherein the drive controller is further configured to:
      control driving of the motor included in the shift range switching system to cause the engaging member to move to the corresponding one of the recesses according to the shift range, and then perform cancel energization control to energize the coil with a cancellation current which is a current reducing a magnetic flux density of the stator according to the polarity of the stator; and stop the energization to the coil, based on a condition that the rotor has not been rotated by the energization of the cancellation current.

2. The shift range control apparatus according to claim 1, wherein:

the drive controller is further configured to change an energization phase of the cancellation current according to a rotation direction of the rotor, based on a condition that the rotor is rotated by the energization of the cancellation current.

3. A system comprising:

a shift range control apparatus and a shift range switching system; wherein:

the shift range control apparatus comprises:
- a drive controller configured to control the shift range switching system; and
- a polarity determination device;

the shift range switching system includes a motor and a shift range mechanism, the motor includes:
- a stator that is wound by a coil; and
- a rotor that is rotated by an energization to the coil, the shift range switching mechanism includes:
- a driven member that has a plurality of recesses and is driven by the motor;
- an engaging member that is movable between the recesses through the driving of the motor and fitting into corresponding one of the recesses according to a shift range; and
- a pressing member that presses the engaging member in a direction of fitting the engaging member into the corresponding one of the recesses, the polarity determination device is configured to determine a polarity of the stator facing the rotor, the drive controller is further configured to:

control driving of the motor included in the shift range switching system to cause the engaging member to move to the corresponding one of the recesses according to the shift range, and then perform cancel energization control to energize the coil with a cancellation current which is a current reducing a magnetic flux density of the stator according to the polarity of the stator; and stop the energization to the coil, based on a condition that the rotor has not been rotated by the energization of the cancellation current.

4. The shift range control apparatus according to claim 3, wherein:

the drive controller is further configured to change an energization phase of the cancellation current according to a rotation direction of the rotor, based on a condition that the rotor is rotated by the energization of the cancellation current.

* * * * *